United States Patent
Mishra et al.

(10) Patent No.: US 9,894,702 B2
(45) Date of Patent: Feb. 13, 2018

(54) PERFORMING PRIMARY CELL FUNCTIONS IN A SECONDARY CELL

(71) Applicant: INTEL IP CORPORATION, Santa Clara, CA (US)

(72) Inventors: Anjali Mishra, Portland, OR (US); Candy Yiu, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/957,488

(22) Filed: Dec. 2, 2015

(65) Prior Publication Data
US 2016/0338137 A1 Nov. 17, 2016

Related U.S. Application Data

(60) Provisional application No. 62/161,785, filed on May 14, 2015.

(51) Int. Cl.
*H04W 36/00* (2009.01)
*H04W 76/04* (2009.01)
(Continued)

(52) U.S. Cl.
CPC ......... *H04W 76/045* (2013.01); *H04W 36/08* (2013.01); *H04W 36/16* (2013.01);
(Continued)

(58) Field of Classification Search
CPC ..... H04W 36/08; H04W 36/12; H04W 36/14; H04W 36/18; H04W 36/30;
(Continued)

(56) References Cited

U.S. PATENT DOCUMENTS

2004/0203778 A1* 10/2004 Kuo ..................... H04W 76/046 455/436
2011/0207465 A1* 8/2011 Dwyer ................ H04W 76/046 455/450
(Continued)

FOREIGN PATENT DOCUMENTS

WO WO 2012/146305 A1 11/2012
WO WO 2014/110813 A1 7/2014
(Continued)

OTHER PUBLICATIONS

3GPP TS 36.331 V12.5.0 Evolved Universal Terrestrial Radio Access (E-UTRA); Radio Resource Control (RRC); Protocol specification (Release 12) (Mar. 2015) Valbonne—France.

*Primary Examiner* — Keith Fang
*Assistant Examiner* — B. M. M Hannan
(74) *Attorney, Agent, or Firm* — Thorpe North & Western

(57) ABSTRACT

Technology for maintaining connectivity between a user equipment (UE) and a secondary (e)NodeB when connectivity is lost between the UE and a primary (e)NodeB is disclosed. The UE can start a first timer for monitoring a connection between the UE and the primary (e)NodeB. The UE can start a second timer for monitoring a connection between the UE and the secondary (e)NodeB. The UE can detect radio link failure (RLF) between the UE and the primary (e)NodeB after expiry of the first timer at the UE. The UE can maintain the connection with the secondary (e)NodeB while the second timer is unexpired, wherein the secondary (e)NodeB is configured to behave like the primary (e)NodeB or become the primary (e)NodeB depending on a capability of the UE and for a selected period of time after the connectivity between the UE and the primary (e)NodeB is lost.

15 Claims, 9 Drawing Sheets

(51) Int. Cl.
  *H04W 36/08* (2009.01)
  *H04W 36/16* (2009.01)
  *H04W 36/30* (2009.01)
  *H04W 76/06* (2009.01)
  *H04W 36/04* (2009.01)
  *H04W 76/02* (2009.01)

(52) U.S. Cl.
  CPC ............ *H04W 36/30* (2013.01); *H04W 36/04* (2013.01); *H04W 76/025* (2013.01); *H04W 76/028* (2013.01); *H04W 76/068* (2013.01)

(58) Field of Classification Search
  CPC ............... H04W 76/045; H04W 36/16; H04W 74/0833; H04W 76/025; H04W 76/068; H04W 36/04; H04W 88/16
  USPC ............. 455/436, 115.1, 67.1, 226.1; 370/330–333
  See application file for complete search history.

(56) References Cited

U.S. PATENT DOCUMENTS

| | | | |
|---|---|---|---|
| 2011/0216732 A1* | 9/2011 | Maeda | H04W 4/08 370/329 |
| 2012/0224470 A1* | 9/2012 | Jeong | H04W 36/08 370/221 |
| 2012/0281548 A1* | 11/2012 | Lin | H04W 36/30 370/242 |
| 2014/0050113 A1* | 2/2014 | Rosa | H04W 52/0229 370/252 |
| 2014/0092873 A1* | 4/2014 | Hamilton | H04W 36/0094 370/332 |
| 2014/0148174 A1* | 5/2014 | Teyeb | H04W 36/0083 455/441 |
| 2014/0233524 A1* | 8/2014 | Jang | H04W 74/0833 370/329 |
| 2014/0335863 A1* | 11/2014 | Wu | H04W 76/048 455/436 |
| 2015/0044972 A1* | 2/2015 | Lee | H04W 24/10 455/67.11 |
| 2015/0045035 A1 | 2/2015 | Nigam et al. | |
| 2015/0087317 A1* | 3/2015 | Yiu | H04W 24/04 455/441 |
| 2015/0117183 A1 | 4/2015 | Heo et al. | |
| 2015/0181479 A1* | 6/2015 | Lin | H04W 36/0061 370/331 |
| 2015/0359031 A1* | 12/2015 | Yamamoto | H04L 5/0098 370/329 |
| 2015/0365872 A1* | 12/2015 | Dudda | H04W 36/0055 455/436 |
| 2016/0112924 A1* | 4/2016 | Turakhia | H04W 36/30 370/332 |
| 2016/0183321 A1* | 6/2016 | Wen | H04W 76/025 370/329 |
| 2016/0192269 A1* | 6/2016 | Kim | H04W 36/30 370/332 |
| 2016/0330680 A1* | 11/2016 | Yi | H04W 48/16 |

FOREIGN PATENT DOCUMENTS

WO    WO 2014/111499 A1    7/2014
WO    WO 2015/019172 A2    2/2015

\* cited by examiner

*RadioResourceConfigDedicated information element*

```
-- ASN1START

RadioResourceConfigDedicated-r13 ::=    SEQUENCE {
    rlf-TimersAndConstants-r13    RLF-TimersAndConstants-r13    OPTIONAL,
-- Cond CA Call Cont
    ...
}

-- ASN1STOP
```

FIG. 3

*RLF-TimersAndConstants information element*

```
-- ASN1START

RLF-TimersAndConstants-r13 ::=      CHOICE {
    release                             NULL,
    setup                               SEQUENCE {
        t310-short                          ENUMERATED {
                                                ms0, ms50, ms100, ms200, ms500, ms1000, ms 2000),
        n310-short                          ENUMERATED {
                                                n1, n2, n3, n4, n6, n8, n10, n20),
    ...
}

-- ASN1STOP
```

FIG. 4

*UE-TimersAndConstants information element*

```
-- ASN1START

UE-TimersAndConstants ::=        SEQUENCE {
    t300                             ENUMERATED
                                         ms100, ms200, ms300, ms400, ms600,
ms1000, ms1500, ms2000}, t301                             ENUMERATED {
                                         ms100, ms200, ms300, ms400, ms600,
ms1000, ms1500, ms2000}, t310                             ENUMERATED {
                                         ms0, ms50, ms100, ms200, ms500, ms1000,
ms 2000}, n310                             ENUMERATED {
                                         n1, n2, n3, n4, n6, n8, n10, n20}, n310 short                       ENUMERATED {
                                         n1, n2, n3, n4, n6, n8, n10, n20}, t311                             ENUMERATED {
                                         ms1000, ms300, ms5000, ms10000, ms15000,
ms20000, ms 30000}, n311                             ENUMERATED {
                                         n1, n2, n3, n4, n5, n6, n8, n10}, t310 short                       ENUMERATED {
                                         ms0, ms50, ms100, ms200, ms500, ms1000},
    ...
}

-- ASN1STOP
```

FIG. 5

| Timer | Start | Stop | At Expiry |
|---|---|---|---|
| T301 | Transmission of RRCConnectionReestablishment Request | Reception of RRC ConnectionReestablishment or RRCConnectionReestablishment Reject message as well as when the selected cell becomes unsuitable | Go to RRC IDLE |
| T310 | Upon detecting physical layer problems for the PCell, i.e., upon receiving N310 consecutive out-of-sync indications from lower layers | Upon receiving N311 consecutive in-sync indications from lower layers from the PCell, upon triggering the handover procedure and upon initiating the connection reestablishment procedure | If security is not activated, go to RRC IDLE; else initiate the connection reestablishment procedure |
| T310 Short | Upon detecting physical layer problems for the SCell, i.e., upon receiving N310 short consecutive out-of-sync indications from lower layers | Upon receiving N311 short consecutive in-sync indications from lower layers from the SCell, upon triggering the handover procedure and upon triggering the handover procedure and upon call drop | Go to RRC IDLE |
| T311 | Upon initiating the RRC connection reestablishment procedure | Selection of a suitable E-UTRA cell or a cell using another RAT | Enter RRC IDLE |
| T360 | Upon SCell starts acting as new PCell or SCell becomes PCell by handover | Better PCell found | Go to RRC IDLE |

FIG. 6

| Name | Value |
|---|---|
| T310 | Ms1000 |
| N310 | N1 |
| T311 | Ms1000 |
| N311 | N1 |
| T310_short | Ms750 |
| N310_short | N1 |

FIG. 7

PERFORMING PRIMARY CELL FUNCTIONS IN A SECONDARY CELL

RELATED APPLICATIONS

The present application claims priority to U.S. Provisional Patent Application No. 62/161,785, filed May 14, 2015, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, (e)NodeBs, or eNBs) and Radio Network Controllers (RNCs), which communicates with the wireless device, known as a user equipment (UE). The downlink (DL) transmission can be a communication from the node (e.g., (e)NodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 is abstract syntax notation (ASN) code describing a radio resource configuration dedicated information element (IE) in accordance with an example;

FIG. 4 is abstract syntax notation (ASN) code describing a radio link failure (RLF) timers and constants information element (IE) in accordance with an example;

FIG. 5 is abstract syntax notation (ASN) code describing a user equipment (UE) timers and constants information element (IE) in accordance with an example;

FIG. 6 is a table describing various timers in accordance with an example;

FIG. 7 is a table describing various timers and associated constants in accordance with an example;

Figure 1:
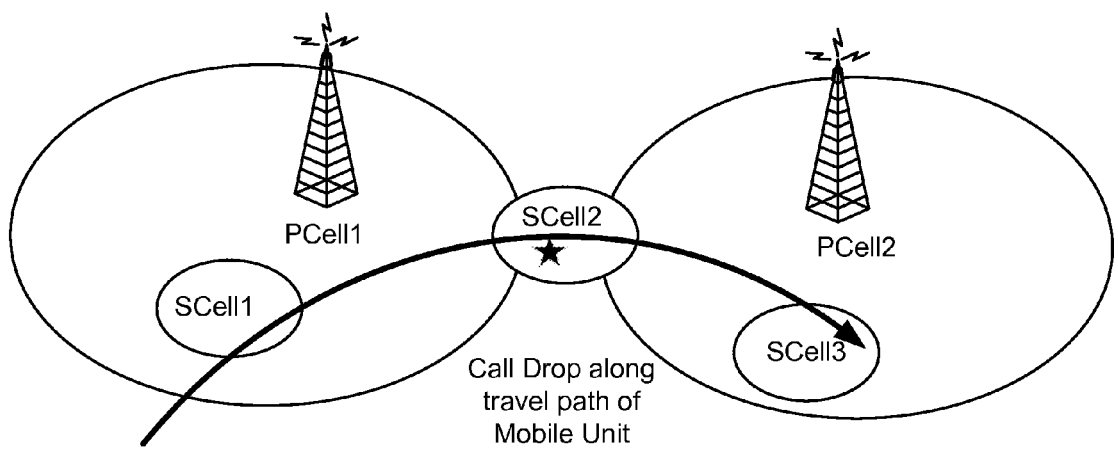
FIG. 1 illustrates a user equipment (UE) configured for dual connectivity (DC) moving from a first primary cell to a second primary cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for maintaining connectivity between a user equipment (UE) and a secondary (e)NodeB (or cell) when connectivity is lost between the UE and a primary (e)NodeB (or cell). The UE can be configured for carrier aggregation (CA) and/or dual connectivity. In one example, the UE can start a first timer to monitor a connection between the UE and the primary (e)NodeB, and the UE can start a second timer to monitor a connection between the UE and the primary (e)NodeB. The UE can detect radio link failure (RLF) between the UE and the primary (e)NodeB after expiry of the first timer at the UE, wherein the RLF causes the connectivity between the UE and the primary (e)NodeB to be lost. However, the UE can maintain the connection between the UE and the secondary (e)NodeB, as long as the second timer is unexpired. In addition, the secondary (e)NodeB can behave like the primary (e)NodeB or become the primary (e)NodeB for a selected period of time after the connectivity between the UE and the primary (e)NodeB is lost. The secondary (e)NodeB can behave like the primary (e)NodeB or become the primary (e)NodeB depending on a capability of the UE. In one example, the UE can perform radio channel measurements of other primary (e)NodeBs, and identify a new primary (e)NodeB with radio channel measurements that are above a defined threshold. The UE can perform a radio resource control (RRC) connection reestablishment procedure to create a connection between the UE and the new primary (e)NodeB, wherein the secondary (e)NodeB that is behaving like the primary (e)NodeB or has become the primary (e)NodeB reverts back to being the secondary (e)NodeB when the connection is created between the UE and new the primary (e)NodeB.

In dual connectivity, a user equipment (UE) can connect to both a primary (e)NodeB and a secondary (e)NodeB simultaneously. The primary (e)NodeB can be associated with a primary cell or macro cell. The secondary (e)NodeB can be associated with a secondary cell or small cell (e.g., a pico cell). The primary (e)NodeB can operate in the same or different frequency bands as the secondary (e)NodeB. The primary (e)NodeB and the secondary (e)NodeB can be connected via an X2 interface. The primary (e)NodeB can be connected to a core network via an S1 interface, and the secondary (e)NodeB can be connected to the core network via the primary (e)NodeB.

In one example, the primary (e)NodeB can be a high transmission power (e)NodeB for coverage and connectivity. The primary (e)NodeB is responsible for mobility because the coverage of the primary (e)NodeB is generally wider than that of the secondary (e)NodeB. The primary (e)NodeB can also be responsible for radio resource control (RRC) signaling. On the other hand, the secondary (e)NodeB can be a low transmission power (e)NodeB for traffic offloading (i.e., offloading data transmissions) and quality of service (QoS) enhancement. The primary (e)NodeB and the secondary (e)NodeB can both serve packet data depending on the required QoS. For example, the primary (e)NodeB can serve delay sensitive data, such as Voice over IP (VoIP), while the secondary (e)NodeB can provide delay tolerant data, such as file transfer protocol (FTP).

In one example, the UE can be supported by both the primary (e)NodeB and the secondary (e)NodeB in order to ensure mobility robustness, satisfy QoS performance and balance the traffic load between the primary (e)NodeB and the secondary (e)NodeB. In other words, the UE can support dual connectivity because the UE is served by both the primary (e)NodeB and the secondary (e)NodeB. With such dual connectivity, the primary (e)NodeB can handle control plane signaling and delay-sensitive traffic, while the secondary (e)NodeB can handle delay-tolerant user-plane traffic.

In 3GPP LTE/UMTS Release 12 (and earlier versions), the UE can connect to more than one cell site simultaneously (i.e., the primary (e)NodeB and the secondary (e)NodeB) when the UE is configured for dual connectivity. When the UE connects to two cells, the UE can receive data bearers from both cells at substantially the same time. The multiple bearers can be sent to the UE based on a location of an S1-U termination and location of the bearer split. In Architecture 3C, the S1-U may be terminated at the primary (e)NodeB and the bearer split may occur at a packet data convergence protocol (PDCP) layer of the primary (e)NodeB. In addition, independent radio link controls (RLCs) may be present in the primary (e)NodeB and the secondary (e)NodeB for the split bearers. The primary (e)NodeB may be connected to an Evolved Packet Core (EPC) via an S1 interface. For example, the primary (e)NodeB may be connected to a serving gateway (S-GW) or mobility management entity (MME) via the S1 interface. The primary (e)NodeB may include a PDCP layer, an RLC layer and a media access channel (MAC) layer. The secondary (e)NodeB may include an RLC layer and a MAC layer. The primary (e)NodeB may receive data and/or control information from higher layers at the PDCP layer (e.g., IP layer or application layer). In one example, the data or control information may be communicated from the PDCP layer in the primary (e)NodeB to the RLC and MAC layers in the primary (e)NodeB. The data or control information may be communicated, from the PDCP layer in the primary (e)NodeB, to the RLC layer in the secondary (e)NodeB via an X2 interface. In other words, due to the split bearer, the data is communicated from the primary (e)NodeB to the secondary (e)NodeB, and then forwarded to the UE.

In carrier aggregation, the UE is only connected to one (e)NodeB. The (e)NodeB can aggregate multiple carriers, and scheduling can be performed across multiple carriers. The UE can maintain a single stack for the (e)NodeB. In other words, the UE can maintain only one PDCP layer, one RLC layer, etc. In dual connectivity, the UE is connected to two (e)NodeBs. Therefore, the UE can maintain two separate stacks for the two (e)NodeBs. The UE can have separate connections for each (e)NodeB (i.e., there are separate bearers for each connection).

FIG. 1 illustrates an example of a user equipment (UE) configured for dual connectivity (DC) moving from a first primary cell (PCell1) to a second primary cell (PCell2). When the UE is within the first primary cell, the UE can be associated with the first primary cell and a first secondary cell (SCell1). A coverage area of the first secondary cell can be within a coverage area of the first primary cell. More specifically, the UE can be connected to both a first primary (e)NodeB in the first primary cell and a first secondary (e)NodeB in the first secondary cell.

While the UE is connected to the first primary cell, the UE can move towards a cell edge of the first primary cell, which is in proximity to a cell edge of a second primary cell. In other words, the first primary cell and the second primary cell can be adjacent to each other. In the example shown in FIG. 1, the UE can connect to a second secondary cell when the UE moves to the area between the first primary cell and the second primary cell.

In one example, channel conditions in the area between the first primary cell and the second primary cell can become poor, and as a result, the first primary cell can have a high frame error rate (FER). In other words, due to the poor channel conditions at the location between the first primary cell and the second primary cell, a number of packets communicated from the first primary cell to the UE are in error. When the first primary cell experiences the high FER for a certain period of time, the first primary cell can undergo radio link failure (RLF). When the first primary cell undergoes RLF, the first primary cell cannot perform a reestablishment procedure (i.e., to reconnect with the UE) when the channel conditions do not improve within a defined reestablishment time for the first primary cell.

In previous solutions, when reestablishment of the first primary cell fails, the UE needs to release all secondary cells to which the UE is currently connected, and perform a primary cell selection procedure in which the UE searches for a new primary cell with better channel conditions. While handover between primary cells is possible, the UE has to release all secondary cells and then reconnect to the secondary cells after the handover of primary cells is completed.

In the example shown in FIG. 1, under the previous solution, the UE would release the connection with the second secondary cell and search for a new primary cell. As a result, when a primary cell link quality is below a defined threshold, the UE declares radio link failure (RLF) after a certain period of time, and the second secondary cell is released and the call is dropped.

In some cases, when the UE is receiving traffic (e.g., a call) from within a primary cell, a signal strength of the primary cell may become low or weakened in certain areas (e.g., at a cell edge). The weakened signal strength can cause the primary cell to drop the call. In addition, there may be no other primary cells with strong channel conditions to take over the traffic for the UE. While the UE can have other secondary cells with suitable channel conditions, there may not be a primary cell with strong channel conditions for performing handover. When the UE cannot perform handover with another primary cell, then the UE declares RLF and drops the connection between the UE and the primary cell, thereby dropping the call. In previous solutions, when RLF occurs, the secondary cell is also dropped along with the primary cell. Therefore, in previous solutions, the secondary cell could not continue the traffic after the primary cell was dropped, even if the channel conditions for the secondary cell were above a defined threshold. In previous solutions, the secondary cell does not have the necessary signaling capability to continue the traffic.

As described in greater detail below, in the current technology, the connection between the UE and the secondary cell can be temporarily maintained (assuming the secondary cell has suitable channel conditions), even after the connection between the UE and the primary cell is dropped. The secondary cell can continue carrying the traffic until another primary cell with suitable channel conditions is located. In other words, the secondary cell can be kept alive until another primary cell becomes available. In addition, the secondary cell can temporarily act like a primary cell or temporarily become a primary cell, and as a result, the secondary cell can perform some of the functionalities that were previously performed by the primary cell. After a new primary cell is found and a connection is established between the new primary cell and the UE, the secondary cell can stop performing some of the functionalities that are typically associated with the primary cell.

Figure 2:
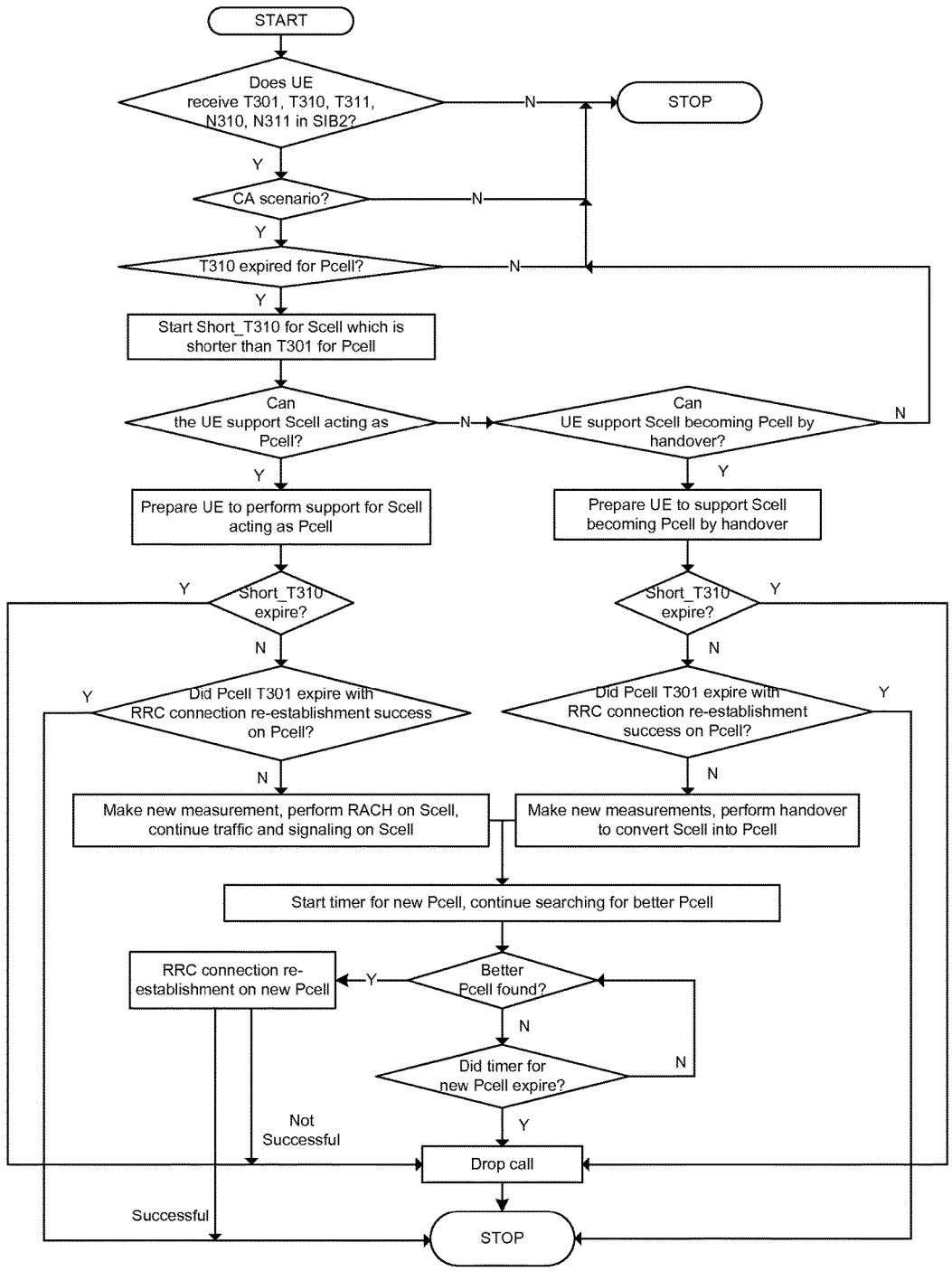
FIG. 2 is a flow chart containing operations for maintaining connectivity between a user equipment (UE) and a secondary (e)NodeB when a connection between the UE and a primary (e)NodeB is terminated or temporarily disabled in accordance with an example.

FIG. 2 is an exemplary flow chart containing operations for maintaining connectivity between a user equipment (UE) and a secondary cell when a connection between the UE and a primary cell is terminated or temporarily disabled. The primary cell can be associated with a primary (e)NodeB and the secondary cell can be associated with a secondary (e)NodeB. In particular, the connectivity between the UE and the secondary cell is maintained while the secondary cell acts like the primary cell. In other words, the secondary cell can perform various functionalities that were previously performed by the primary cell (which is now terminated or temporarily disabled). Alternatively, the connectivity between the UE and the secondary cell is maintained while the secondary cell becomes the primary cell. Whether the secondary cell acts like the primary cell or becomes the primary cell can be dependent on the capabilities of the secondary cell (i.e., whether the secondary cell is capable of becoming the primary cell or only acting like the primary cell). As a result, radio link failure (RLF) can be avoided at the UE. At a later time, the UE can reconnect with the primary cell or connect with a new primary cell, at which time the secondary cell can stop performing the various functionalities of the primary cell.

In one example, the UE can receive various timers and constants from the primary (e)NodeB in a system information block (SIB) 2 message. These timers can include a T301 timer, a T310 timer, a T311 timer, a N310 count and a N311 count. These timers and constants can be used by the UE to determine whether a high frame error rate (FER) occurs between the UE and the primary cell, which can cause radio link failure (RLF).

In one example, the UE cannot maintain connectivity with the secondary cell when the UE is not configured for dual connectivity or carrier aggregation. In this case, the UE is only connected to a single cell (or (e)NodeB). When the connection between the UE and the single cell is dropped, the UE will have to search for a new cell and then establish a new connection with the new cell.

In one example, the connection between the UE and the primary cell can be monitored using timers. In particular, the T310 timer and N310 count, as well as the T311 timer and N311 count, can start running at the UE. When the channel quality of the primary cell begins to degrade and starts experiencing some high frame error rates, then a number of counts will start to increase. When a number of consecutive frames that are in error reaches a defined value (e.g., 10 consecutive frames), then RLF can occur at the UE unless the next frame is not in error (e.g., the $11^{th}$ frame). In one example, RLF can be declared by the UE after a maximum number of consecutive "out-of-sync" indications received from lower layers (N310) and a maximum number of consecutive "in-sync" indications received from lower layers (N311). As a result, the secondary cell is released and the voice call is dropped.

When RLF occurs at the UE, the T310 timer can expire for the primary cell. In other words, the T310 timer can expire when the number of consecutive frame that are in error reaches the defined value. If the T310 timer does not expire, then the connection between the UE and the primary cell will continue to be maintained since the channel quality for the primary cell is suitable.

After expiration of the T310 timer, the UE can start running a short T310 timer for the secondary cell. The function of the short T310 timer is to determine whether the secondary cell is also suffering from the poor channel quality similar to the primary cell. In other words, the short T310 timer can be used to determine if the secondary cell also has a certain number of consecutive subframes that are in error. As a result, the FER can be monitored on both the primary cell and the secondary cell. In one example, the short T310 timer can have a reduced length as compared to the T310 timer for the primary cell. If the short T310 timer does not expire, then the secondary cell does not have an overly large number of consecutive subframes that are in error (i.e., the secondary cell has suitable channel conditions).

In one example, if the short T310 timer for the secondary cell expires (due to RLF), then the UE is unable to maintain a connection with the secondary cell. As a result, the connection between the UE and the secondary cell is terminated and the call is dropped.

In one example, after the T310 timer expires due to high FER for the primary cell, a T301 timer can start running at the UE. The T301 timer allows additional time for the UE to reconnect with the primary cell through a radio resource control (RRC) connection reestablishment procedure with the primary cell. In other words, the UE is given a certain amount of time to reestablish the RRC connection with the primary cell, even though the UE previously declared RLF. If the T310 timer expires, then the RRC connection reestablishment procedure was successful. In this case, both the primary cell and the secondary cell will continue to be connected to the UE. If the T301 does not expire, then the UE remains unconnected to the primary cell due to the RRC connection being unable to be reestablished.

When the T310 timer expires for the primary cell (causing high FER and hence RLF) and the short T310 timer does not expire for the secondary cell (indicating a low FER), then a new measurement reporting event is triggered at the UE. The new measurement reporting event can initially be configured for the UE by the network. The UE can send the measurement report to the primary cell. The measurement report can indicate that the channel conditions are weak between the UE and the primary cell. In addition, the measurement report can indicate a secondary cell that is capable of performing some of the functionalities of the primary cell. The secondary cell can be the secondary cell that is already connected to the UE or another secondary cell (i.e., a target secondary cell).

In one example, the secondary cell can perform some of the functionalities of the primary cell by temporarily acting like the primary cell, or alternatively, by temporarily becoming the primary cell. The secondary cell can temporarily act like the primary cell or temporarily become the primary cell until a new primary cell is found. By allowing the secondary cell to temporarily act like or become the primary cell, voice calls can be continued on the UE even after channel conditions with the primary cell deteriorate and RLF occurs, thereby ensuring voice call continuity for the UE.

Whether the secondary cell temporarily acts like the primary cell or temporarily becomes the primary cell can depend on the capabilities of the UE. In some cases, the UE can only support the secondary cell acting like the primary cell, and in other cases, the UE can only support the secondary cell becoming the primary cell. If the UE does not support the secondary cell acting like the primary cell, then the secondary cell becoming the primary cell can be considered if supported at the UE. In some cases, whether the secondary cell acts like the primary cell or becomes the primary cell can depend on the capabilities of the secondary cell. In other words, if the secondary cell is configured to perform all of the functions that the primary cell is configured to perform, then the secondary cell can temporarily become the primary cell. If the secondary cell is only configured to perform a portion of the functions that the primary cell is configured to perform, then the secondary cell can temporarily act like the primary cell.

The primary cell can receive the measurement report from the UE. If the UE is capable of supporting the secondary cell acting like the primary cell, then the primary cell can initiate a procedure with the secondary cell which enables the secondary cell to temporarily start acting like the primary cell (which includes receiving measurement reports). If the UE is capable of supporting the secondary cell becoming the primary cell, then the primary cell can initiate a handover procedure with the secondary cell which enables the secondary cell to temporarily switch to or become the primary cell.

In one example, the procedure that enables the secondary cell to start acting like the primary cell or become the primary cell via handover can involve the primary cell forwarding relevant information about the UE to the secondary cell. This information can include UE context information and a bearer configuration. Based on this information, the secondary cell can start acting like the primary cell or become the primary cell via handover. If handover is performed, the primary cell that serves the UE can effectively transfer its primary cell duties to the secondary cell, such that the secondary cell becomes the new primary cell for the UE. After the secondary cell becomes the new primary cell, the previous primary cell can be dropped.

In an alternative configuration, the UE can send the measurement report to the secondary cell when RLF has already occurred for the primary cell, thereby breaking the connection between the UE and the primary cell. The secondary cell can forward the measurement report the primary cell. After receiving the measurement report, the primary cell can determine to initiate a procedure to cause the secondary cell to start acting like the primary cell, or the primary cell can initiate a procedure to cause the secondary cell to become the primary cell through handover.

At this point, the UE can be connected to only the secondary cell (or the new primary cell if the handover is performed), and the secondary cell can perform various functionalities that were previously performed by the primary cell by either acting like the primary cell or becoming the primary cell via handover. Some examples of the functionalities now performed by the secondary cell include: receiving radio signal measurements from the UE, performing a random access channel (RACH) procedure with the UE in order to allocate traffic resources (e.g., radio resources) for the UE, performing RRC and non-access stratum (NAS) signaling with the UE, configuring measurement gaps for the UE, adjusting radio bearers to allow signaling and data communications between the UE and the secondary cell, assigning or allocating logical channel identifiers (IDs) and being able to support these logical channel IDs, performing power head room reporting, performing discontinuous reception (DRX), receiving PDCP status reports in order to perform scheduling for the UE, performing timing advance, and performing other types of reporting to support the physical channel. In addition, the secondary cell can continue to perform signaling and data transfer to the UE. Any data that was routed to the previous primary cell will now be routed to the secondary cell.

In one example, when the secondary cell supports becoming the primary cell (via handover), then the secondary cell has the full functionality of the primary cell. Thus, the secondary cell (which is now the new primary cell) is configured to provide the same functionality that a typical primary cell would provide. In order for the secondary cell to become the primary cell, the secondary cell has to support an increased amount of control plane signaling. In addition, the secondary cell has to be connected to a mobility management entity (MME) and a serving gateway (SGW). On the other hand, if the secondary cell is merely acting like the primary cell, then the secondary cell does not support the full functionality of the primary cell. Rather, the secondary cell will only support a set of minimum features, such that the UE is able to maintain a minimum amount of signaling and data transfer.

After the secondary cell starts acting like the primary cell or becomes the primary cell via handover, a T360 timer can be started at the UE. The T360 timer can provide the UE with a certain amount of time to search for and ultimately connect to a new actual primary cell (as opposed to a secondary cell that is merely acting like a primary cell). The UE can perform radio signal measurements in order to identify the new primary cell. The UE can piggyback the radio signal measurements on traffic communicated to the secondary cell. If the UE has a history of measurements, then a new primary cell can be found in a reduced amount of time (e.g., 100 ms). If there is no measurement history, then the UE can take approximately 5-10 seconds to identify a primary cell. If such a primary cell is found (e.g., event A7), then the T360 timer is stopped and the UE can perform an RRC connection reestablishment procedure with this new primary cell. In other words, if an A7 event occurs, the UE finds a new radio signal with better quality than a current radio signal, and then the UE can switch to the new primary cell associated with the new radio signal. The UE can establish the connection with the new primary cell, and the secondary cell that was acting like the primary cell will now revert back to acting like a typical secondary cell, or alternatively, the secondary cell that became the primary cell through handover will now be handed back and will become a typical secondary cell. If the RRC connection reestablishment procedure with the new primary cell is successful, then the process ends. If the RRC connection reestablishment procedure with the new primary cell is not successful, then the call can be dropped.

If a new primary cell is not identified within the certain amount of time (i.e., the T360 timer expires), then the secondary cell that acts like the primary cell or became the primary cell will cease to function, and the call will be dropped for the UE. In one example, the T360 timer can run for a period of time that ranges from tens of milliseconds to tens of minutes, thereby providing the UE a sufficient amount of time to identify the new primary cell.

In one example, the UE is initially connected to the primary cell (e.g., a macro cell) and the secondary cell (e.g., a small cell) in dual connectivity. After the connection between the UE and the primary cell is dropped, the UE is only connected to the secondary cell for a period of time. Even though the secondary cell can act like the primary cell or become the primary cell, the secondary cell is still the small cell, such as a pico cell. Since the secondary cell is the small cell, the range and coverage area for the UE is limited. In addition, the limited range and coverage area can be a problem when the UE is moving. As a result, the secondary cell acting like the primary cell or becoming the primary cell may only be a temporary solution to ensure data connectivity with certain quality of service (QoS), and the UE will try to find an actual primary cell (e.g., a macro cell) in order to improve performance at the UE. Due to the limitations of the UE only being connected to the secondary cell (which acts like or becomes the primary cell), the T360 timer can be initiated at the UE and the connection to the secondary cell is dropped when the T360 timer expires.

In one example, based on the radio signal measurements performed at the UE, the UE can identify another secondary cell with more favorable channel conditions as compared to the secondary cell that is acting like the primary cell or has become the primary cell. In this case, the UE can switch to the other secondary cell with more favorable channel conditions. However, even if the UE switches between secondary cells, the T360 timer will still run, and the UE will be expected to find a new primary cell.

In one configuration, the primary cell can be temporarily inactivated when the primary cell undergoes radio link failure (RLF). In other words, the primary cell may not be terminated, but rather is temporarily inactivated, and then reactivated at a later time. In particular, the primary cell can be temporarily inactivated when the primary cell and the secondary cell follow architecture 3C. As previously discussed, in Architecture 3C, the bearer split can occur at a packet data convergence protocol (PDCP) layer of the primary (e)NodeB associated with the primary cell.

At a first time, the UE can be connected to a first primary cell and a first secondary cell. The UE can move out of the coverage area of the first secondary cell, which results in the first secondary cell being released. At a second time, the UE can approach a second secondary cell, and then the UE can connect to the second secondary cell. At a third time, the signal associated with the first primary cell can degrade due to the UE being at a cell edge of the first primary cell. At a fourth time, the UE can start performing a voice call. The UE can receive the voice call and other data via the primary cell on the split bearer. At a fifth time, the primary cell can undergo RLF at the UE. As a result, the primary cell can switch the voice call data to the secondary cell in the split bearer. In addition, a new primary cell inactive timer (PCellInactiveTimer) can be introduced. The value of the timer can be configured by the network, and the UE can start this timer when the primary cell undergoes RLF and there is ongoing traffic (which switches to the secondary cell in the split bearer). When the primary cell undergoes RLF, in order to continue the voice call for the UE, the primary cell can be temporarily disabled while the UE receives the voice call from the secondary cell. This disable feature means that the air interface between the primary (e)NodeB associated with the primary cell and the UE is inactive for the duration of a primary cell transit timer (PCellTransitTimer). During the period of time during which the primary (e)NodeB is disabled, the UE is allowed to finish the voice call using the split bearer in the secondary cell. During this period of time, the UE may be able to find a new primary cell and establish a connection with the new primary cell. For example, the UE can be handed over to the new primary cell. In one example, if the primary cell inactive timer is expired, then the UE's ongoing traffic can be terminated.

In this configuration, the primary cell is temporarily disabled (as opposed to terminated) due, in part, to the architecture of the primary cell and the secondary cell. In Architecture 3C, data is routed through the primary cell, and then forwarded to the secondary cell. In this case, the primary cell does not release the bearer, but instead continues to forward traffic to the secondary cell. No new bearers are required for setup and no security issues are involved with the primary cell forwarding the data to the secondary cell. When the data is already routed through the primary cell and forwarded to the secondary cell, it is more complicated for the secondary cell to become the primary cell since the split bearer is already set up. If the secondary cell is to become the primary cell, then a new bearer has to be established, additional forwarding is involved resulting in increased signaling overhead, etc. Therefore, in this configuration, the primary cell can temporarily become inactive so the primary cell would not have an air interface to the UE. But since the bearer is already established, the primary cell can continue forwarding data to the secondary cell using a backhaul link between the primary cell and the secondary cell, and the UE can continuously maintain connectivity with the secondary cell.

In one configuration, when carrier aggregation (CA) is configured, the UE only has one RRC connection with the network, as further defined in 3GPP Technical Specification (TS) 36.000 Clause 7.5 (Release 12). At RRC connection establishment or reestablishment or handover, one serving cell can provide non-access stratum (NAS) mobility information, such as a tracking area identity (TAI), and at the RRC connection reestablishment or handover, one serving cell can provide the security input. The one serving cell is referred to as a primary cell (PCell). In the downlink, the carrier corresponding to the PCell is a downlink primary component carrier (DL PCC) while in the uplink, the carrier corresponding to the PCell is the uplink primary component carrier (UL PCC). Depending on UE capabilities, secondary cells (SCells) can be configured to form, together with the PCell, a set of serving cells. In the downlink, the carrier corresponding to an SCell is a downlink secondary component carrier (DL SCC) while in the uplink, the carrier corresponding to the SCell is the uplink secondary component carrier (UL SCC).

In one configuration, the configured set of serving cells for the UE includes one PCell and one or more SCells. For each SCell, the usage of uplink resources by the UE, as well as the downlink resources, is configurable. The number of DL SCSS configured can be larger than or equal to the number of UL SCCs, and no SCell can be configured for usage of uplink resources only. From a UE viewpoint, each uplink resource only belongs to one serving cell. The number of serving cells that can be configured depends on the aggregation capability of the UE. The PCell can be changed with a handover procedure (i.e., with security key change and RACH procedure) or with an SCell promotion to the PCell (i.e., an SCell starts acting like the PCell). The PCell can be used for transmission of a physical uplink control channel (PUCCH). The PCell cannot be deactivated unlike the SCells. An RRC reestablishment procedure can be triggered when the PCell and/or the SCell experiences RLF. In addition, NAS information can be taken from the PCell.

In one example, the reconfiguration, addition and removal of SCells can be performed using RRC signaling. At intra-LTE handover, RRC signaling can be used to add, remove or reconfigure SCells for usage with the target PCell. When adding a new SCell, dedicated RRC signaling is used for sending system information associated with the SCell, i.e., while in connected mode, and the UEs do not need to acquire broadcasted system information directly from the SCells.

In one example, if a received radio link failure timers and constants (rlf-TimersAndConstants) information element (IE) is set to release, then the UE can use values for timers T301, T310, T310 short, T311 and constants N310, N310 short, N311, as included in a UE Timers and Constants (ue-TimersAndConstants) information element (IE) received in a system information block (SIB) type 2, as further defined in 3GPP TS 36.331 Section 5.3.10.7 (Release 12). Otherwise, the UE can reconfigure the values of timers and constants in accordance with the received radio link failure timers and constants (rlf-TimersAndConstants) information element (IE).

In one example, the technology described herein can be implemented in Third Generation Partnership Project (3GPP) Long Term Evolution (LTE) Release 12. However, the technology can also be applicable to different cellular radio and wireless technologies, such as Universal Mobile Telecommunications System (UMTS), wireless local area network (WLAN), etc.

FIG. 3 is exemplary abstract syntax notation (ASN) code describing a radio resource configuration dedicated information element (IE). In one example, the radio resource configuration dedicated IE can include a radio link failure (RLF) timers and constants parameter. In addition, the radio resource configuration dedicated IE can be used to setup, modify and release resource blocks (RBs). The radio resource configuration dedicated IE can be used to modify a medium access control (MAC) configuration. In addition, the radio resource configuration dedicated IE can be used to modify a semi-persistent scheduling (SPS) configuration and modify a dedicated physical configuration.

FIG. 4 is exemplary abstract syntax notation (ASN) code describing a radio link failure (RLF) timers and constants information element (IE). The RLF timers and constants IE can include user equipment (UE) specific timers and constants applicable to UEs that are in RRC connected mode. The RLF timers and constants IE can define a T310 short timer and a N310 short constant.

FIG. 5 is exemplary abstract syntax notation (ASN) code describing a user equipment (UE) timers and constants information element (IE). The UE timers and constants IE can include timers and constants used by the UE when the UE is in RRC connected mode or RRC idle mode. The RLF timers and constants IE can define a N310 short constant and a T310 short timer. As non-limiting examples, the T310 short timer can be set to 0 milliseconds (ms), 50 ms, 100 ms, 200 ms, 500 ms, 1000 ms or 2000 ms.

FIG. 6 is an exemplary table describing various timers. A T301 timer can start after a transmission of an RRC connection reestablishment request, and the T301 timer can stop at a reception of an RRC connection reestablishment message or an RRC connection reestablishment message, as well as when the selected cell becomes unsuitable. When the T301 timer expires, the UE can go to RRC idle mode. A T310 timer can start upon detecting physical layer problems for the PCell, i.e., upon receiving N310 consecutive out-of-sync indications from lower layers, and the T310 timer can stop upon receiving N311 consecutive in-sync indications from lower layers from the PCell, upon triggering the handover procedure, and upon initiating the connection reestablishment procedure. When the T310 timer expires, the UE can go to RRC idle mode if security is not activated, or else the UE can initiate the connection reestablishment procedure. A T310 short timer can start upon detecting physical layer problems for the SCell, i.e., upon receiving N310 short consecutive out-of-sync indications from lower layers, and the T310 short timer can stop upon receiving N311 short consecutive in-sync indications from lower layers from the SCell, upon triggering the handover procedure, upon triggering the handover procedure and upon call drop. When the T310 short timer expires, the UE can go to RRC idle mode. A T311 timer can start upon initiating the RRC connection reestablishment procedure, and the T311 timer can stop upon selection of a suitable E-UTRA cell or a cell using another radio access technology (RAT). When the T311 timer expires, the UE can go into RRC idle mode. A T360 timer can start when the UE starts acting as a new PCell or when the SCell becomes the PCell by handover, and the T360 timer can stop when a better PCell is found in terms of channel quality. When the T360 timer expires, the UE can go into RRC idle mode.

FIG. 7 is an exemplary table describing various timers and associated constants. The timers can include a T310 timer, T311 timer and a T310 short timer. As non-limiting examples, the T310 timer can be set to 1000 milliseconds (ms), the T311 timer can be set to 1000 ms, and the T310 short timer can be set to 750 ms. The constants can include a N310 constant (that is associated with the T310 timer) and a N311 constant (that is associated with the T311 timer).

Figure 8:
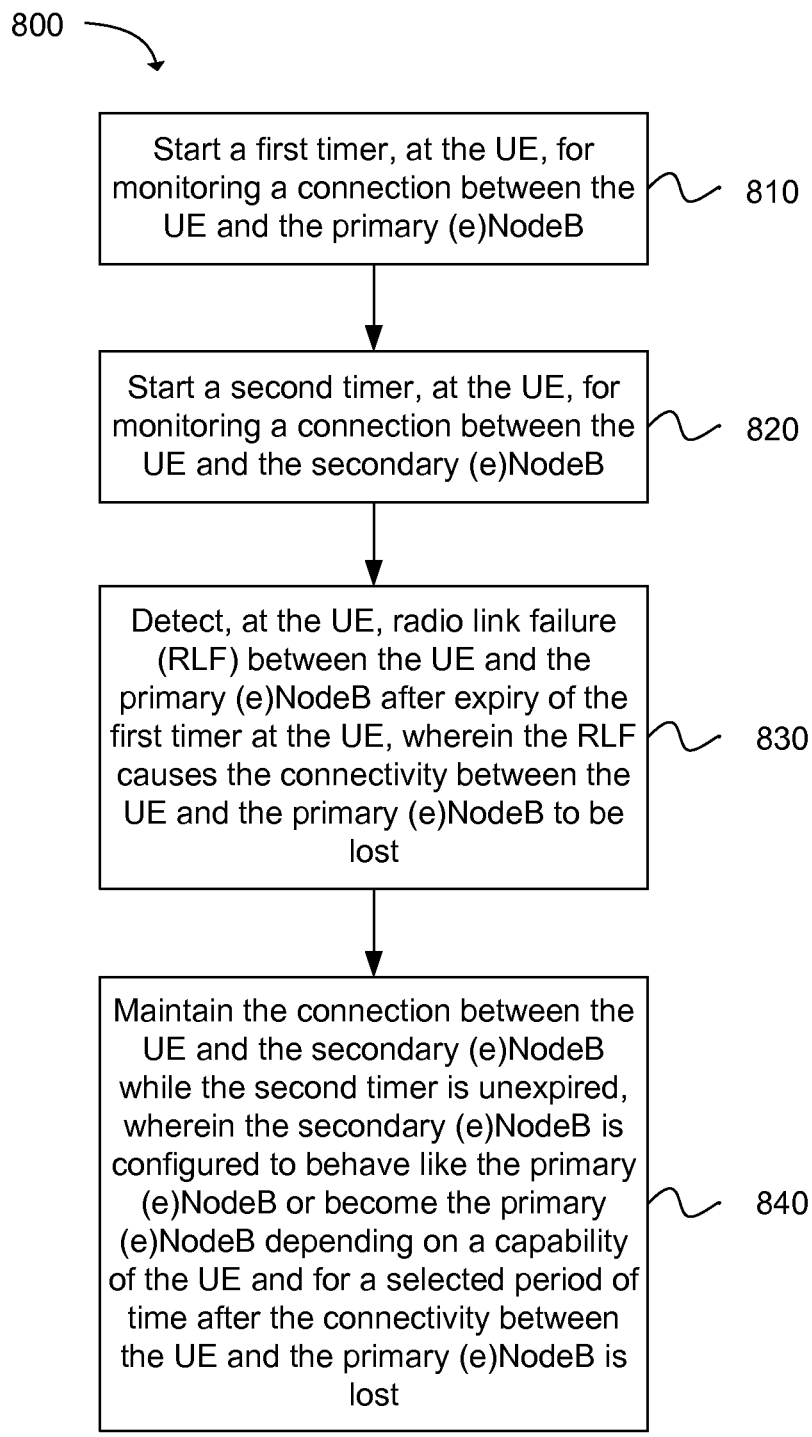
FIG. 8 depicts functionality of a user equipment (UE) operable to maintain connectivity with a secondary (e)NodeB when connectivity is lost between the UE and a primary (e)NodeB in accordance with an example.

Another example provides functionality 800 of a user equipment (UE) operable to maintain connectivity with a secondary (e)NodeB when connectivity is lost between the UE and a primary (e)NodeB, as shown in the flow chart in FIG. 8. The functionality can be implemented as a method or the functionality can be executed as instructions on a machine, where the instructions are included on at least one computer readable medium or one non-transitory machine readable storage medium. The UE can comprise circuitry configured to start a first timer, at the UE, for monitoring a connection between the UE and the primary (e)NodeB, as in block 810. The UE can comprise circuitry configured to start a second timer, at the UE, for monitoring a connection between the UE and the secondary (e)NodeB, as in block

820. The UE can comprise circuitry configured to detect, at the UE, radio link failure (RLF) between the UE and the primary (e)NodeB after expiry of the first timer at the UE, wherein the RLF causes the connectivity between the UE and the primary (e)NodeB to be lost, as in block 830. The UE can comprise circuitry configured to maintain the connection between the UE and the secondary (e)NodeB while the second timer is unexpired, wherein the secondary (e)NodeB is configured to behave like the primary (e)NodeB or become the primary (e)NodeB depending on a capability of the UE and for a selected period of time after the connectivity between the UE and the primary (e)NodeB is lost, as in block 840.

Figure 9:
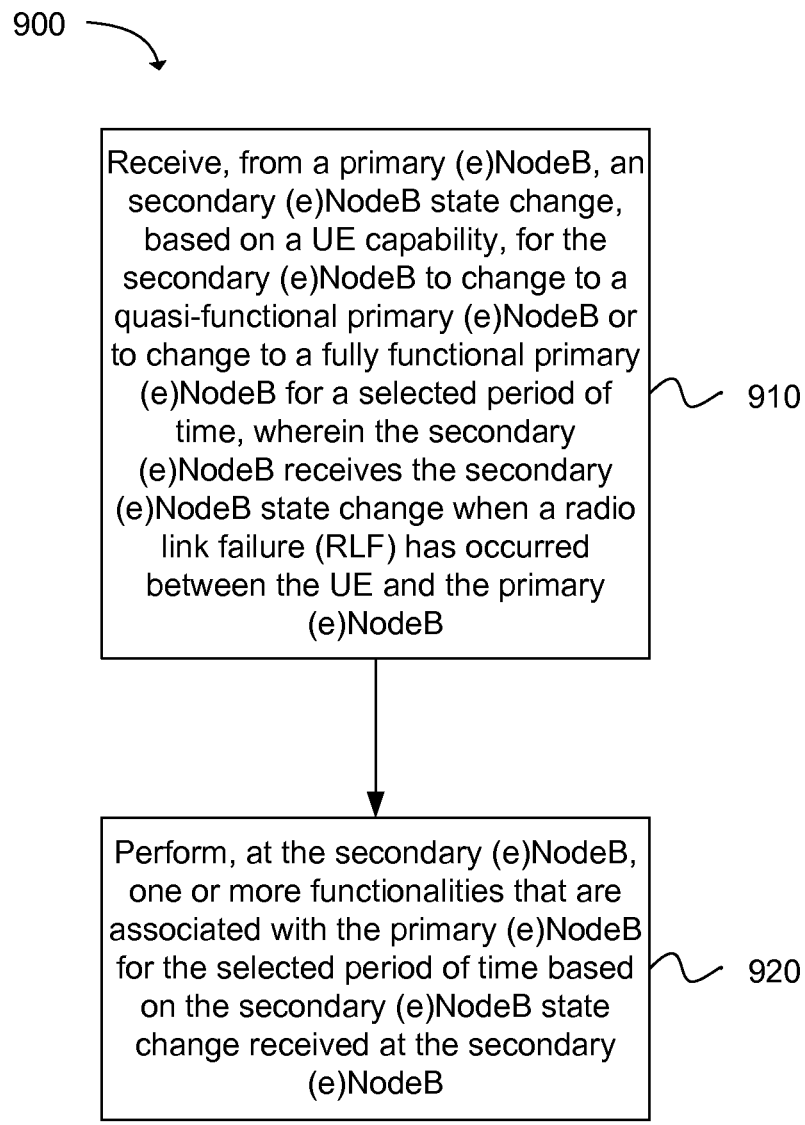
FIG. 9 depicts functionality of a secondary (e)NodeB operable to maintain connectivity with a user equipment (UE) in accordance with an example.

Another example provides functionality 900 of a secondary (e)NodeB operable to maintain connectivity with a user equipment (UE), as shown in the flow chart in FIG. 9. The functionality can be implemented as a method or the functionality can be executed as instructions on a machine, where the instructions are included on at least one computer readable medium or one non-transitory machine readable storage medium. The secondary (e)NodeB can comprise circuitry configured to: receive, from a primary (e)NodeB, an secondary (e)NodeB state change, based on a UE capability, for the secondary (e)NodeB to change to a quasi-functional primary (e)NodeB or to change to a fully functional primary (e)NodeB for a selected period of time, wherein the secondary (e)NodeB receives the secondary (e)NodeB state change when a radio link failure (RLF) has occurred between the UE and the primary (e)NodeB, as in block 910. The secondary (e)NodeB can comprise circuitry configured to: perform, at the secondary (e)NodeB, one or more functionalities that are associated with the primary (e)NodeB for the selected period of time based on the secondary (e)NodeB state change received at the secondary (e)NodeB, as in block 920.

Figure 10:
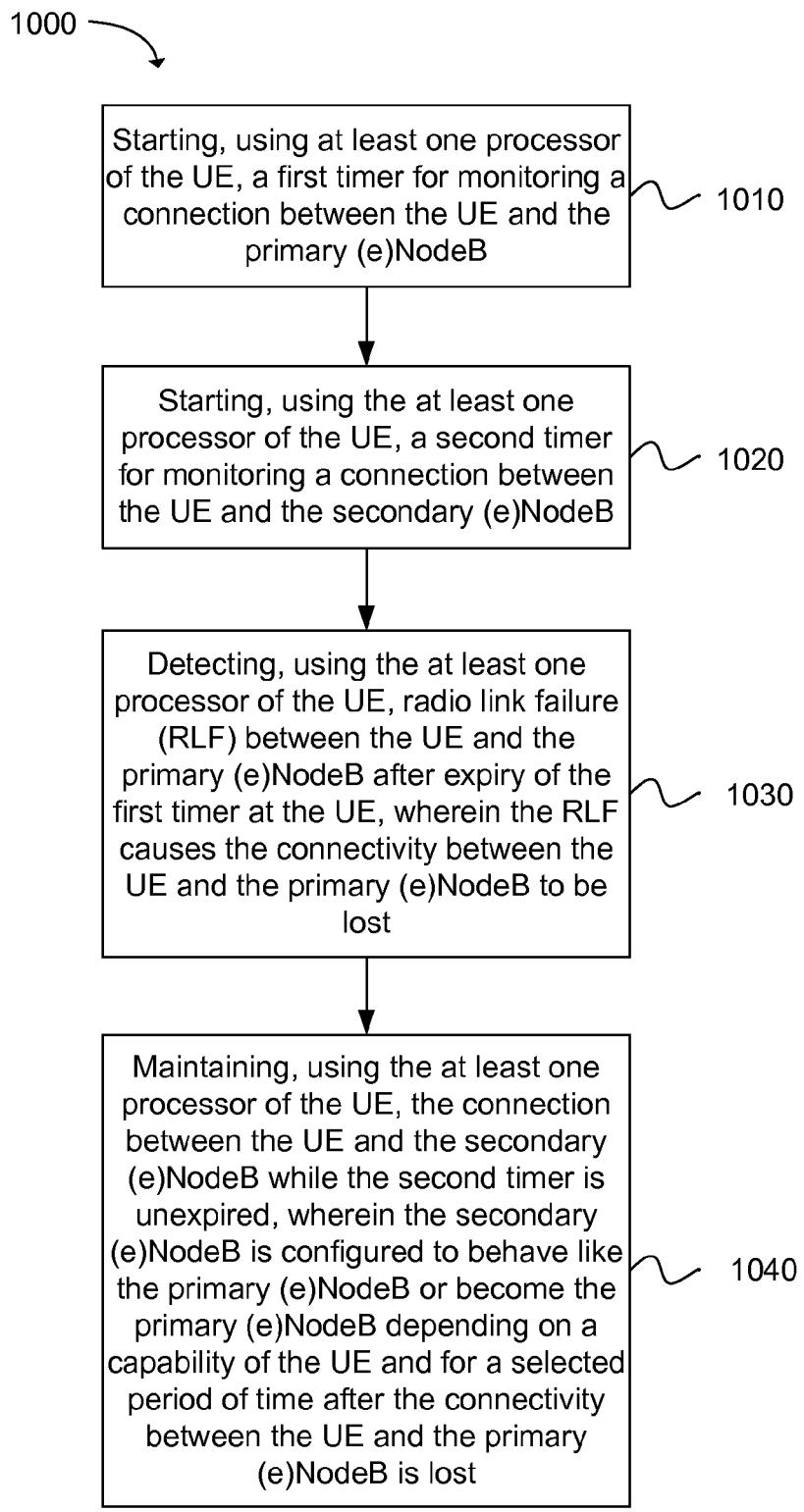
FIG. 10 depicts a flowchart of a machine readable storage medium having instructions embodied thereon for maintaining connectivity between a user equipment (UE) and a secondary (e)NodeB when connectivity is lost between the UE and a primary (e)NodeB in accordance with an example.

Another example provides at least one machine readable storage medium having instructions 1000 embodied thereon for maintaining connectivity between a user equipment (UE) and a secondary (e)NodeB when connectivity is lost between the UE and a primary (e)NodeB, as shown in the flow chart in FIG. 10. The instructions when executed perform: starting, using at least one processor of the UE, a first timer for monitoring a connection between the UE and the primary (e)NodeB, as in block 1010. The instructions when executed perform: starting, using the at least one processor of the UE, a second timer for monitoring a connection between the UE and the secondary (e)NodeB, as in block 1020. The instructions when executed perform: detecting, using the at least one processor of the UE, radio link failure (RLF) between the UE and the primary (e)NodeB after expiry of the first timer at the UE, wherein the RLF causes the connectivity between the UE and the primary (e)NodeB to be lost, as in block 1030. The instructions when executed perform: maintaining, using the at least one processor of the UE, the connection between the UE and the secondary (e)NodeB while the second timer is unexpired, wherein the secondary (e)NodeB is configured to behave like the primary (e)NodeB or become the primary (e)NodeB depending on a capability of the UE and for a selected period of time after the connectivity between the UE and the primary (e)NodeB is lost, as in block 1040.

Figure 11:
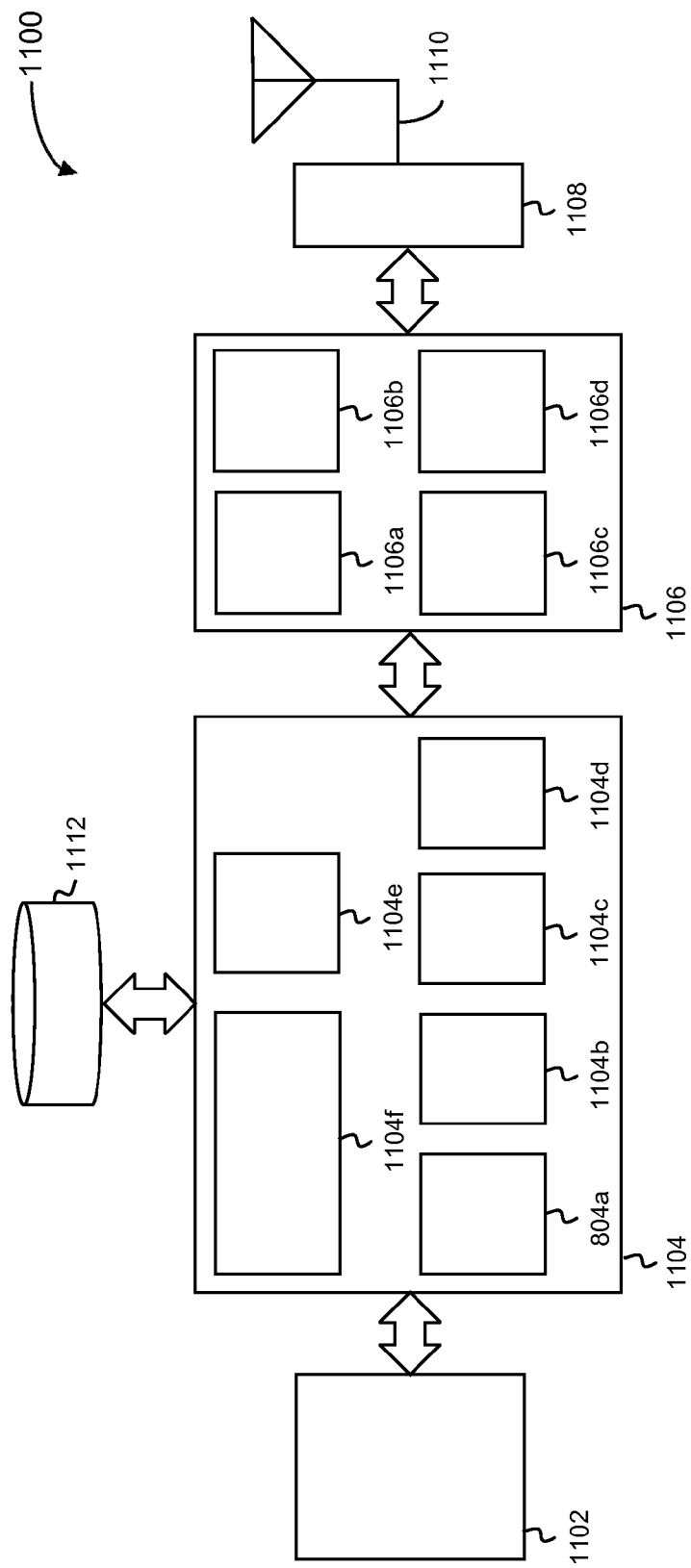
FIG. 11 illustrates a diagram of a wireless device (e.g., UE) in accordance with an example.

FIG. 11 provides an example illustration of a user equipment (UE) device 1100, such as a wireless device, a mobile station (MS), a mobile wireless device, a mobile communication device, a tablet, a handset, or other type of wireless device. The UE device 1100 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1100 can be configured to communicate using at least one wireless communication standard including 3GPP LTE, WiMAX, High Speed Packet Access (HSPA), Bluetooth, and WiFi. The UE device 1100 can communicate using separate antennas for each wireless communication standard or shared antennas for multiple wireless communication standards. The UE device 1100 can communicate in a wireless local area network (WLAN), a wireless personal area network (WPAN), and/or a WWAN.

In some embodiments, the UE device 1100 may include application circuitry 1102, baseband circuitry 1104, Radio Frequency (RF) circuitry 1106, front-end module (FEM) circuitry 1108 and one or more antennas 1110, coupled together at least as shown.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 1112 and may be configured to execute instructions stored in the storage medium 1112 to enable various applications and/or operating systems to run on the system.

The baseband circuitry 1104 may include circuitry such as, but not limited to, one or more single-core or multi-core processors. The baseband circuitry 1104 may include one or more baseband processors and/or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a second generation (2G) baseband processor 1104a, third generation (3G) baseband processor 1104b, fourth generation (4G) baseband processor 1104c, and/or other baseband processor(s) 1104d for other existing generations, generations in development or to be developed in the future (e.g., fifth generation (5G), 6G, etc.). The baseband circuitry 1104 (e.g., one or more of baseband processors 1104a-d) may handle various radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, and/or constellation mapping/demapping functionality. In some embodiments, encoding/decoding circuitry of the baseband circuitry 1104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1104e of the baseband circuitry 1104 may be configured to run elements of the protocol stack for signaling of the PHY, MAC, RLC, PDCP and/or RRC layers. In some embodiments, the baseband circuitry may include one or more audio digital signal processor(s) (DSP) 1104f. The audio DSP(s) 1104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the RF circuitry 1106 may include a receive signal path and a transmit signal path. The receive signal path of the RF circuitry 1106 may include mixer circuitry 1106a, amplifier circuitry 1106b and filter circuitry 1106c. The transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c. The filter circuitry 1106c may include a low-pass filter (LPF), although the scope of the embodiments is not limited in this respect.

In some embodiments, the mixer circuitry 1106a of the receive signal path and the mixer circuitry 1106a of the transmit signal path may include two or more mixers and may be arranged for quadrature down-conversion and/or up-conversion respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct down-conversion and/or direct up-conversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110.

In some embodiments, the UE device 1100 may include additional elements such as, for example, memory/storage, display (e.g., touch screen), camera, antennas, keyboard, microphone, speakers, sensor, and/or input/output (I/O) interface.

EXAMPLES

The following examples pertain to specific invention embodiments and point out specific features, elements, or actions that can be used or otherwise combined in achieving such embodiments.

Example 1 includes an apparatus of a user equipment (UE) operable to maintain connectivity with a secondary (e)NodeB when connectivity is lost between the UE and a primary (e)NodeB, the apparatus comprising one or more processors and memory configured to: start a first timer, at the UE, for monitoring a connection between the UE and the primary (e)NodeB; start a second timer, at the UE, for monitoring a connection between the UE and the secondary (e)NodeB; detect, at the UE, radio link failure (RLF) between the UE and the primary (e)NodeB after expiry of the first timer at the UE, wherein the RLF causes the connectivity between the UE and the primary (e)NodeB to be lost; and maintain the connection between the UE and the secondary (e)NodeB while the second timer is unexpired, wherein the secondary (e)NodeB is configured to behave like the primary (e)NodeB or become the primary (e)NodeB depending on a capability of the UE and for a selected period of time after the connectivity between the UE and the primary (e)NodeB is lost.

Example 2 includes the apparatus of Example 1, further configured to: perform radio channel measurements of other primary (e)NodeBs when the secondary (e)NodeB is behaving like the primary (e)NodeB or after the secondary (e)NodeB has become the primary (e)NodeB; identify a new primary (e)NodeB with radio channel measurements that are above a defined threshold in accordance with an event A7; and perform a radio resource control (RRC) connection reestablishment procedure to create a connection between the UE and the new primary (e)NodeB, wherein the secondary (e)NodeB that is behaving like the primary (e)NodeB or has become the primary (e)NodeB reverts back to being the secondary (e)NodeB when the connection is created between the UE and new the primary (e)NodeB.

Example 3 includes the apparatus of any of Examples 1-2, further configured to: start a third timer, at the UE, for identifying another primary (e)NodeB with radio channel measurements that are above a defined threshold; and terminate the connection between the UE and the secondary (e)NodeB after expiry of the third timer.

Example 4 includes the apparatus of any of Examples 1-3, wherein the connection between the UE and the primary (e)NodeB is terminated or temporarily disabled when the secondary (e)NodeB is behaving like the primary (e)NodeB or has become the primary (e)NodeB.

Example 5 includes the apparatus of any of Examples 1-4, further configured to reestablish the connection with the primary (e)NodeB after successful completion of a radio resource control (RRC) connection reestablishment procedure.

Example 6 includes the apparatus of any of Examples 1-5, further configured to receive the first timer and the second timer from the primary (e)NodeB in a system information block 2 (SIB2) message, wherein the first timer is a T310 timer and the second timer is T310 short timer.

Example 7 includes the apparatus of any of Examples 1-6, further configured to perform random access channel (RACH) signaling with the secondary (e)NodeB that is behaving like the primary (e)NodeB or has become the primary (e)NodeB in order to receive resource allocations from the secondary (e)NodeB.

Example 8 includes the apparatus of any of Examples 1-7, further configured to: send a measurement report to the primary (e)NodeB indicating that a frame error rate (FER) is above a defined threshold for the connection between the UE and the primary (e)NodeB, wherein the primary (e)NodeB is configured to instruct the secondary (e)NodeB to behave like the primary (e)NodeB or become the primary (e)NodeB for a limited period of time depending on a capability of the UE.

Example 9 includes the apparatus of any of Examples 1-8, wherein the UE is configured to maintain connectivity with the secondary (e)NodeB when the UE is moving between neighboring cells in a wireless communication network.

Example 10 includes the apparatus of any of Examples 1-9, wherein the UE is configured for at least one of: carrier aggregation (CA) or dual connectivity.

Example 11 includes the apparatus of any of Examples 1-10, wherein the UE includes at least one of an antenna, a touch sensitive display screen, a speaker, a microphone, a graphics processor, an application processor, a baseband processor, an internal memory, a non-volatile memory port, and combinations thereof.

Example 12 includes an apparatus of a secondary (e)NodeB operable to maintain connectivity with a user equipment (UE), the apparatus comprising one or more processors and memory configured to: receive, from a primary (e)NodeB, an secondary (e)NodeB state change, based on a UE capability, for the secondary (e)NodeB to change to a quasi-functional primary (e)NodeB or to change to a fully functional primary (e)NodeB for a selected period of time, wherein the secondary (e)NodeB receives the secondary (e)NodeB state change when a radio link failure (RLF) has occurred between the UE and the primary (e)NodeB; and perform, at the secondary (e)NodeB, one or more functionalities that are associated with the primary (e)NodeB for the selected period of time based on the secondary (e)NodeB state change received at the secondary (e)NodeB.

Example 13 includes the apparatus of Example 12, further configured to receive, from the primary (e)NodeB, UE context information and UE bearer configurations to enable the secondary (e)NodeB to change to the quasi-functional primary (e)NodeB or the fully functional primary (e)NodeB for the selected period of time.

Example 14 includes the apparatus of any of Examples 12-13, wherein the secondary (e)NodeB that changes to the quasi-functional primary (e)NodeB or the fully functional primary (e)NodeB based on the secondary (e)NodeB state change reverts back to being the secondary (e)NodeB after the UE reestablishes a connection with the primary (e)NodeB or establishes a connection with a new primary (e)NodeB.

Example 15 includes the apparatus of any of Examples 12-14, further configured to perform resource allocation for the UE using random access channel (RACH) signaling with the UE.

Example 16 includes the apparatus of any of Examples 12-15, wherein the secondary (e)NodeB is connected to a mobility management entity (MME) and a serving gateway (SGW).

Example 17 includes at least one machine readable storage medium having instructions embodied thereon for maintaining connectivity between a user equipment (UE) and a secondary (e)NodeB when connectivity is lost between the UE and a primary (e)NodeB, the instructions when executed perform the following: starting, using at least one processor of the UE, a first timer for monitoring a connection between the UE and the primary (e)NodeB; starting, using the at least one processor of the UE, a second timer for monitoring a connection between the UE and the secondary (e)NodeB; detecting, using the at least one processor of the UE, radio link failure (RLF) between the UE and the primary (e)NodeB after expiry of the first timer at the UE, wherein the RLF causes the connectivity between the UE and the primary (e)NodeB to be lost; and maintaining, using the at least one processor of the UE, the connection between the UE and the secondary (e)NodeB while the second timer is unexpired, wherein the secondary (e)NodeB is configured to behave like the primary (e)NodeB or become the primary (e)NodeB depending on a capability of the UE and for a selected period of time after the connectivity between the UE and the primary (e)NodeB is lost.

Example 18 includes the at least one machine readable storage medium of Example 17, further comprising instructions which when executed by the at least one processor of the UE performs the following: performing radio channel measurements of other primary (e)NodeBs when the secondary (e)NodeB is behaving like the primary (e)NodeB or after the secondary (e)NodeB has become the primary (e)NodeB; identifying a new primary (e)NodeB with radio channel measurements that are above a defined threshold; and performing a radio resource control (RRC) connection reestablishment procedure to create a connection between the UE and the new primary (e)NodeB, wherein the secondary (e)NodeB that is behaving like the primary (e)NodeB or has become the primary (e)NodeB reverts back to being the secondary (e)NodeB when the connection is created between the UE and new the primary (e)NodeB.

Example 19 includes the at least one machine readable storage medium of any of Examples 17-18, further comprising instructions which when executed by the at least one processor of the UE performs the following: starting a third timer, at the UE, for identifying another primary (e)NodeB with radio channel measurements that are above a defined threshold; and terminating the connection between the UE and the secondary (e)NodeB after expiry of the third timer.

Example 20 includes the at least one machine readable storage medium of any of Examples 17-19, wherein the connection between the UE and the primary (e)NodeB is terminated or temporarily disabled when the secondary (e)NodeB is behaving like the primary (e)NodeB or has become the primary (e)NodeB.

Example 21 includes the at least one machine readable storage medium of any of Examples 17-20, further comprising instructions which when executed by the at least one processor of the UE performs the following: reestablishing the connection with the primary (e)NodeB after successful completion of a radio resource control (RRC) connection reestablishment procedure.

Example 22 includes the at least one machine readable storage medium of any of Examples 17-21, further comprising instructions which when executed by the at least one processor of the UE performs the following: receiving the first timer and the second timer from the primary (e)NodeB in a system information block 2 (SIB2) message, wherein the first timer is a T310 timer and the second timer is T310 short timer.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) operable to maintain connectivity with a secondary (e)NodeB when connectivity is lost between the UE and a primary (e)NodeB, the apparatus comprising one or more processors and memory configured to:
    decode a first timer, at the UE, that is a T310 timer that is received from the primary (e)NodeB;
    start the first timer, at the UE, for monitoring a connection between the UE and the primary (e)NodeB;
    decode a second timer, at the UE, that is a T310 short timer, that is received from the primary (e)NodeB;
    start the second timer, at the UE, for monitoring a connection between the UE and the secondary (e)NodeB;
    detect, at the UE, radio link failure (RLF) between the UE and the primary (e)NodeB after expiry of the first timer at the UE, wherein the RLF causes the connectivity between the UE and the primary (e)NodeB to be lost; and
    maintain the connection between the UE and the secondary (e)NodeB while the second timer is unexpired, wherein the secondary (e)NodeB is configured to behave like the primary (e)NodeB or become the primary (e)NodeB depending on a capability of the UE and for a selected period of time determined after the connectivity between the UE and the primary (e)NodeB is lost;
    perform radio channel measurements of other primary (e)NodeBs when the secondary (e)NodeB is behaving like the primary (e)NodeB;
    identify a new primary (e)NodeB when the radio channel measurements are above a defined threshold; and perform a radio resource control (RRC) connection reestablishment procedure to create a connection between the UE and the new primary (e)NodeB, wherein the secondary (e)NodeB that is behaving like the primary (e)NodeB is configured to revert back to being the secondary (e)NodeB when the connection is created between the UE and the new primary (e)NodeB.

2. The apparatus of claim 1, further configured to:
start a third timer, at the UE, for identifying another primary (e)NodeB with radio channel measurements that are above a defined threshold; and
terminate the connection between the UE and the secondary (e)NodeB after expiry of the third timer.

3. The apparatus of claim 1, wherein the connection between the UE and the primary (e)NodeB is terminated or temporarily disabled when the secondary (e)NodeB is behaving like the primary (e)NodeB or has become the primary (e)NodeB.

4. The apparatus of claim 1, further configured to reestablish the connection with the primary (e)NodeB after successful completion of a radio resource control (RRC) connection reestablishment procedure.

5. The apparatus of claim 1, further configured to receive the first timer and the second timer from the primary (e)NodeB in a system information block 2 (SIB2) message, wherein the first timer is a first T310 timer and the second timer is a second T310 short timer.

6. The apparatus of claim 1, further configured to perform random access channel (RACH) signaling with the secondary (e)NodeB that is behaving like the primary (e)NodeB or has become the primary (e)NodeB in order to receive resource allocations from the secondary (e)NodeB.

7. The apparatus of claim 1, further configured to: send a measurement report to the primary (e)NodeB indicating that a frame error rate (FER) is above a defined threshold for the connection between the UE and the primary (e)NodeB, wherein the primary (e)NodeB is configured to instruct the secondary (e)NodeB to behave like the primary (e)NodeB or become the primary (e)NodeB for a limited period of time depending on a capability of the UE.

8. The apparatus of claim 1, wherein the UE is configured to maintain connectivity with the secondary (e)NodeB when the UE is moving between neighboring cells in a wireless communication network.

9. The apparatus of claim 1, wherein the UE is configured for at least one of: carrier aggregation (CA) or dual connectivity.

10. The apparatus of claim 1, wherein the UE includes at least one of an antenna, a touch sensitive display screen, a speaker, a microphone, a graphics processor, an application processor, a baseband processor, an internal memory, a non-volatile memory port, and combinations thereof.

11. At least one non-transitory machine readable storage medium having instructions embodied thereon for maintaining connectivity between a user equipment (UE) and a secondary (e)NodeB when connectivity is lost between the UE and a primary (e)NodeB, the instructions when executed perform the following:
decoding a first timer, at the UE, that is a first T310 timer that is received from the primary (e)NodeB;
starting, using at least one processor of the UE, the first timer for monitoring a connection between the UE and the primary (e)NodeB;
decoding a second timer, at the UE, that is a second T310 short timer, that is received from the primary (e)NodeB;
starting, using the at least one processor of the UE, the second timer for monitoring a connection between the UE and the secondary (e)NodeB;
detecting, using the at least one processor of the UE, radio link failure (RLF) between the UE and the primary (e)NodeB after expiry of the first timer at the UE, wherein the RLF causes the connectivity between the UE and the primary (e)NodeB to be lost; and
maintaining, using the at least one processor of the UE, the connection between the UE and the secondary (e)NodeB while the second timer is unexpired, wherein the secondary (e)NodeB is configured to behave like the primary (e)NodeB
or become the primary (e)NodeB depending on a capability of the UE and for a selected period of time determined after the connectivity between the UE and the primary (e)NodeB is lost;
perform radio channel measurements of other primary (e)NodeBs when the secondary (e)NodeB is behaving like the primary (e)NodeB;
identify a new primary (e)NodeB when the radio channel measurements are above a defined threshold; and
perform a radio resource control (RRC) connection reestablishment procedure to create a connection between the UE and the new primary (e)NodeB, wherein the secondary (e)NodeB that is behaving like the primary (e)NodeB reverts back to being the secondary (e)NodeB when the connection is created between the UE and the new primary (e)NodeB.

12. The at least one machine readable storage medium of claim 11, further comprising instructions which when executed by the at least one processor of the UE performs the following:
starting a third timer, at the UE, for identifying another primary (e)NodeB with radio channel measurements that are above a defined threshold; and
terminating the connection between the UE and the secondary (e)NodeB after expiry of the third timer.

13. The at least one machine readable storage medium of claim 11, wherein the connection between the UE and the primary (e)NodeB is terminated or temporarily disabled when the secondary (e)NodeB is behaving like the primary (e)NodeB or has become the primary (e)NodeB.

14. The at least one machine readable storage medium of claim 11, further comprising instructions which when executed by the at least one processor of the UE performs the following: reestablishing the connection with the primary (e)NodeB after successful completion of a radio resource control (RRC) connection reestablishment procedure.

15. The at least one machine readable storage medium of claim 11, further comprising instructions which when executed by the at least one processor of the UE performs the following: receiving the first timer and the second timer from the primary (e)NodeB in a system information block 2 (SIB2) message, wherein the first timer is a first T310 timer and the second timer is a second T310 short timer.

* * * * *